(12) United States Patent
Snodgrass

(10) Patent No.: US 7,530,074 B1
(45) Date of Patent: May 5, 2009

(54) JOINT TACTICAL RADIO SYSTEM (JTRS) SOFTWARE COMPUTER ARCHITECTURE (SCA) CO-PROCESSOR

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 810 days.

(21) Appl. No.: 10/789,609

(22) Filed: Feb. 27, 2004

(51) Int. Cl.
G06F 3/00 (2006.01)
G06F 9/44 (2006.01)
G06F 9/46 (2006.01)
G06F 13/00 (2006.01)

(52) U.S. Cl. ..................... 719/311; 719/321
(58) Field of Classification Search ............. 719/311, 719/321
See application file for complete search history.

(56) References Cited

U.S. PATENT DOCUMENTS

| | | | |
|---|---|---|---|
| 5,903,281 A * | 5/1999 | Chen et al. | 345/504 |
| 5,991,820 A * | 11/1999 | Dean | 719/312 |
| 6,477,636 B1 * | 11/2002 | Osterholzer | 712/41 |
| 6,829,769 B2 * | 12/2004 | Cranston et al. | 719/312 |
| 2002/0019843 A1 * | 2/2002 | Killian et al. | 709/102 |
| 2002/0144006 A1 * | 10/2002 | Cranston et al. | 709/312 |
| 2002/0199031 A1 * | 12/2002 | Rust et al. | 709/315 |
| 2004/0019765 A1 * | 1/2004 | Klein | 712/15 |
| 2005/0108382 A1 * | 5/2005 | Murotake et al. | 709/223 |

OTHER PUBLICATIONS

Anderson, J.; Stevens, J.; Mabe, F., "Implementation of a WNW within the JTRS operating environment using networking APIs", 2001, IEEE, Communications for Network-Centric Operations: Creating the Information Force. IEEE, vol. 2, Iss., pp. 972-976.*
Bertrand, J.; Cruz, J.W.; Majkrzak, B.; Rossano, T., "CORBA delays in a software-defined radio", Feb. 2002, IEEE Communications Magazine, vol. 40, Iss.2, pp. 152-155.*
Yau, S.S.; Karim, F., "Context-sensitive object request broker for ubiquitous computing environments," 2001, IEEE, Distributed Computing Systems, FTDCS 2001, pp. 34-40.*
Paulin, P.G.; Pilkington, C., Bensoudane, E.; Langevin, M.; Lyonnard, D., "Application of a multi-processor SoC platform to high-speed packet forwarding," Feb. 16-20, 2004, IEEE, Design, Automation and Test in Europe Conference and Exhibition, vol. 3, pp. 58-63.*

* cited by examiner

Primary Examiner—Li B Zhen
Assistant Examiner—KimbleAnn Verdi

(57) ABSTRACT

A joint tactical radio system (JTRS) software computer architecture (SCA) apparatus that implements services for a waveform application by reducing latency in middleware and the operating system such that more power efficient processors can be used. The apparatus includes an object request broker that marshals data from the waveform application for communication and an object request broker interface that communicates the marshaled data using a memory pool and select functions of an Operating System. At least a portion of the object request broker is implemented in hardware and at least a portion of the object request broker interface is implemented in hardware and at least a portion of the Operating System is implemented in hardware.

8 Claims, 4 Drawing Sheets

JOINT TACTICAL RADIO SYSTEM (JTRS) SOFTWARE COMPUTER ARCHITECTURE (SCA) CO-PROCESSOR

FIELD OF THE INVENTION

The present invention relates to computer processing. More specifically, the present invention relates to a joint tactical radio system (JTRS) software computer architecture (SCA) co-processor.

BACKGROUND OF THE INVENTION

Communication middleware resides between client and server applications in distributed systems. Middleware simplifies application development by providing a uniform view of networks, protocols, and operating system layers. Object Request Brokers (ORBs), such as Common Object Request Broker Architecture (CORBA), DCOM, and Java RMI, eliminate many of the tedious, error-prone, and non-portable aspects of developing and maintaining applications programmed using mechanisms like sockets. In particular, ORBs automate common network programming tasks, such as object location, object activation, parameter (de)marshalling, socket and request demultiplexing, fault recovery, and security.

The United States Department of Defense has mandated compliance to the Joint Tactical Radio System (JTRS) Software Computer Architecture (SCA) for all new communication radios that operate between 2 MHz and 2000 MHz. The SCA further requires software applications to run under an operating system and that data be passed using CORBA middleware. CORBA (Common Object Request Broker Architecture) provides platform-independent programming interfaces and models for portable distributed-oriented computing applications.

Conventional CORBA implementations have limitations that make it hard for them to support performance-sensitive applications effectively. For example, conventional ORBs like CORBA support a limited number of statically configured protocols, often just GIOP (General Inter-ORB Protocol)/IIOP (Internet Inter-ORB Protocol) over TCP/IP. Further, conventional ORBs do not allow applications to configure key protocol policies and properties, such as peak virtual circuit bandwidth or cell pacing rate. Moreover, conventional ORBs do not support simultaneous use of multiple inter-ORB messaging or transport protocols. Yet further, conventional ORBs have limited or no support for specifying and enforcing real-time protocol requirements across a backplane, network, or Internet end-to-end.

Another significant disadvantage of commercial middleware, such as CORBA, and operating systems available today is they are much too slow to allow use in power-constrained applications, such as the Objective Force Warrior, munitions and Unattended Ground Sensors (JTRS Cluster "5"). By adding sufficient processing power to overcome the latency caused by the operating system and middleware, the resulting heat and battery life reductions make compliance with JTRS SCA requirements virtually impossible. For non-battery powered applications, such as JTRS Cluster 1, there is a tremendous recurring cost and heat burden that the program cannot reach. A large pat of the performance demand is required performance because of the excessive heat dissipated by numerous 1000 MIP processors.

One attempt to resolve some of the limitations of middleware, such as CORBA is implementing a pluggable protocol framework. A pluggable protocol framework refers to using customized ORB interfaces that allow data to be passed without going through the operating system. The pluggable protocols are software applications designed using a standard protocol configuration to allow custom messaging and transport protocols to be configured flexibly. Nevertheless, software pluggable protocols are similar in speed to the middleware application and they may not be portable across platforms.

Thus, there is a need to improve the speed by which data is communicated in a communication system by avoiding software applications, such as the operating system and middleware. Further, there is a need to improve latency in SCA compliant software solutions such that more efficient processors can be used. Even further, there is a need for a joint tactical radio system (JTRS) software computer architecture (SCA) co-processor that implements essential services to a waveform application.

SUMMARY OF THE INVENTION

The present invention includes embodiments having an application specific integrated circuit (ASIC) or field programmable gate arrays (FPGA) that implements essential services that an operating system and CORBA provide to a waveform application. The embodiments reduce latency in middleware and the operating system such that more efficient processors with less total capability can be used. For example, an exemplary embodiment relates to an apparatus that implements services for a waveform application. The apparatus includes an object request broker that marshals data from the waveform application for communication and an object request broker interface that communicates the marshaled data using a memory pool. At least a portion of the object request broker is implemented in hardware and at least a portion of the object request broker interface is implemented in hardware.

Another exemplary embodiment relates to a method of marshalling transactions for waveform application communications using a CORBA (Common Object Request Broker Architecture) broker. The method includes marshalling data from a waveform application in a first communication device and interfacing the marshaled data with a second communication device using a memory pool. At least a portion of the marshalling operation is implemented in hardware and at least a portion of the interfacing operation is implemented in hardware.

Still another exemplary embodiment relates to a system for a joint tactical radio system (JTRS) compliant device that provides communication at low power requirements. The system includes a hardware-implemented object request broker (ORB) that marshals data from a waveform application, a pluggable protocol interface that communicates the marshaled data from the hardware-implemented ORB, and a memory pool that communicates data from the pluggable protocol interface directly and without transport overhead. At least a portion of the pluggable protocol interface is implemented in hardware.

BRIEF DESCRIPTION OF THE DRAWINGS

The exemplary embodiments will be described with reference to the accompanying drawings, wherein like numerals denote like elements.

DETAILED DESCRIPTION OF EXEMPLARY EMBODIMENTS

Figure 1:
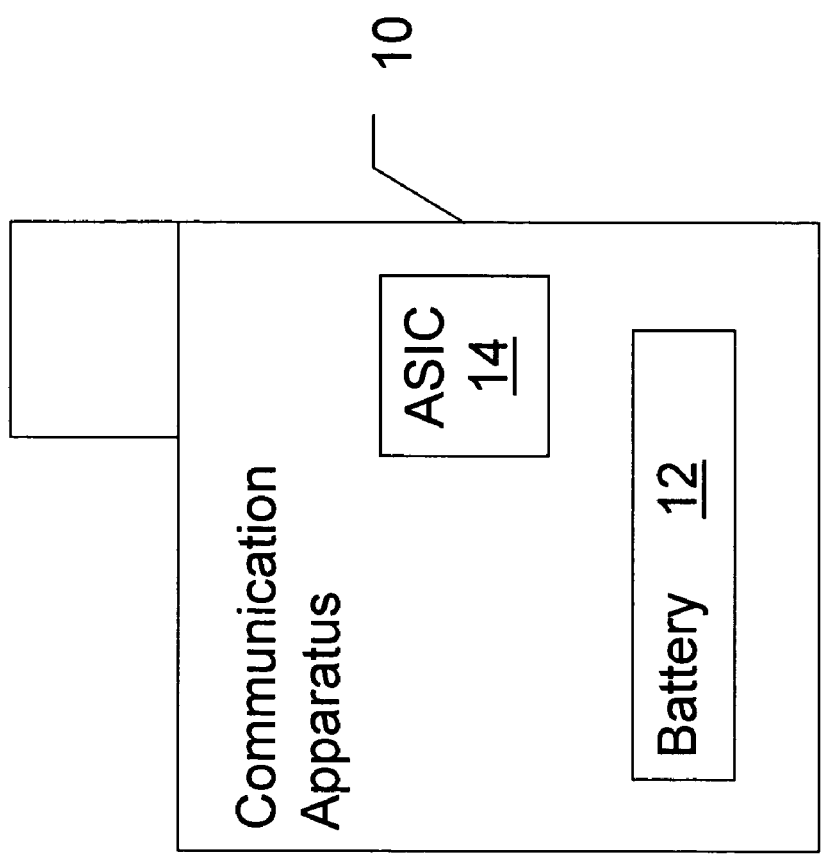
FIG. 1 is a diagram of a communication apparatus having an application specific integrated circuit (ASIC) in accordance with an exemplary embodiment.

FIG. 1 illustrates a communication apparatus 10 having a battery 12. In an exemplary embodiment, the battery 12 has approximately 30-100 watt-hours in power. As such, if the communication apparatus 10 had to operate in an application for a week without a re-charge, it would be limited to a draw of 0.2 to 0.6 watts (time averaged power).

An application specific integrated circuit (ASIC) 14 is included in the communication apparatus 10. The ASIC 14 is programmable by software stored in the communication apparatus 10. The ASIC 14 implements various services that an operating system and an Object Request Broker (ORB) otherwise provide to a waveform application. Implementing services as such reduces operating system and middleware latency. Lower latency allows the use of more efficient processors based on MIPS per milliwatt. Such more efficient processors enable SCA compliant software solutions for battery powered radios, missiles, small unmanned vehicles, and unmanned ground sensors.

Figure 2:
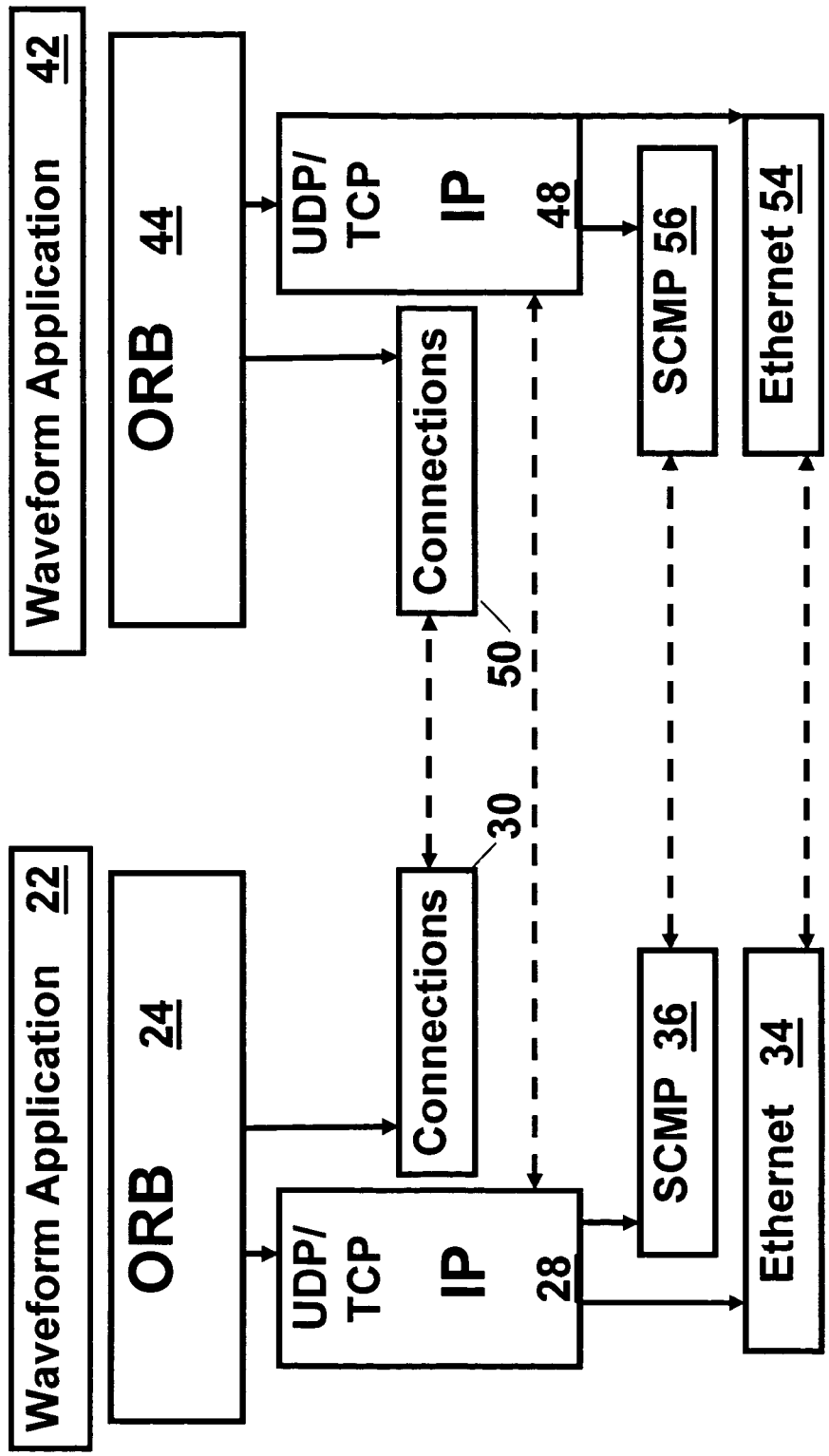
FIG. 2 is a functional view of an architecture for power restricted applications in accordance with a conventional system.

FIG. 2 illustrates a functional view of an architecture for power restricted applications according to known systems. A waveform application 22 communicates with a waveform application 42 using a variety of functions.

Conventional systems utilize a user data protocol (UDP)/transmission control protocol (TCP) interface 28 or a proprietary connections interface 30. The UDP/TCP interface 28 communicates data to an Ethernet 34 and a SCMP (Snuggly Coupled Multi Processor) interface 36. In like fashion, the ORB 44 provides data to a user data protocol UDP)/transmission control protocol (TCP) interface 48 and a proprietary connections interface 50. The UDP/TCP interface 28 communicates data to an Ethernet 54 and a SCMP 56.

Figure 3:
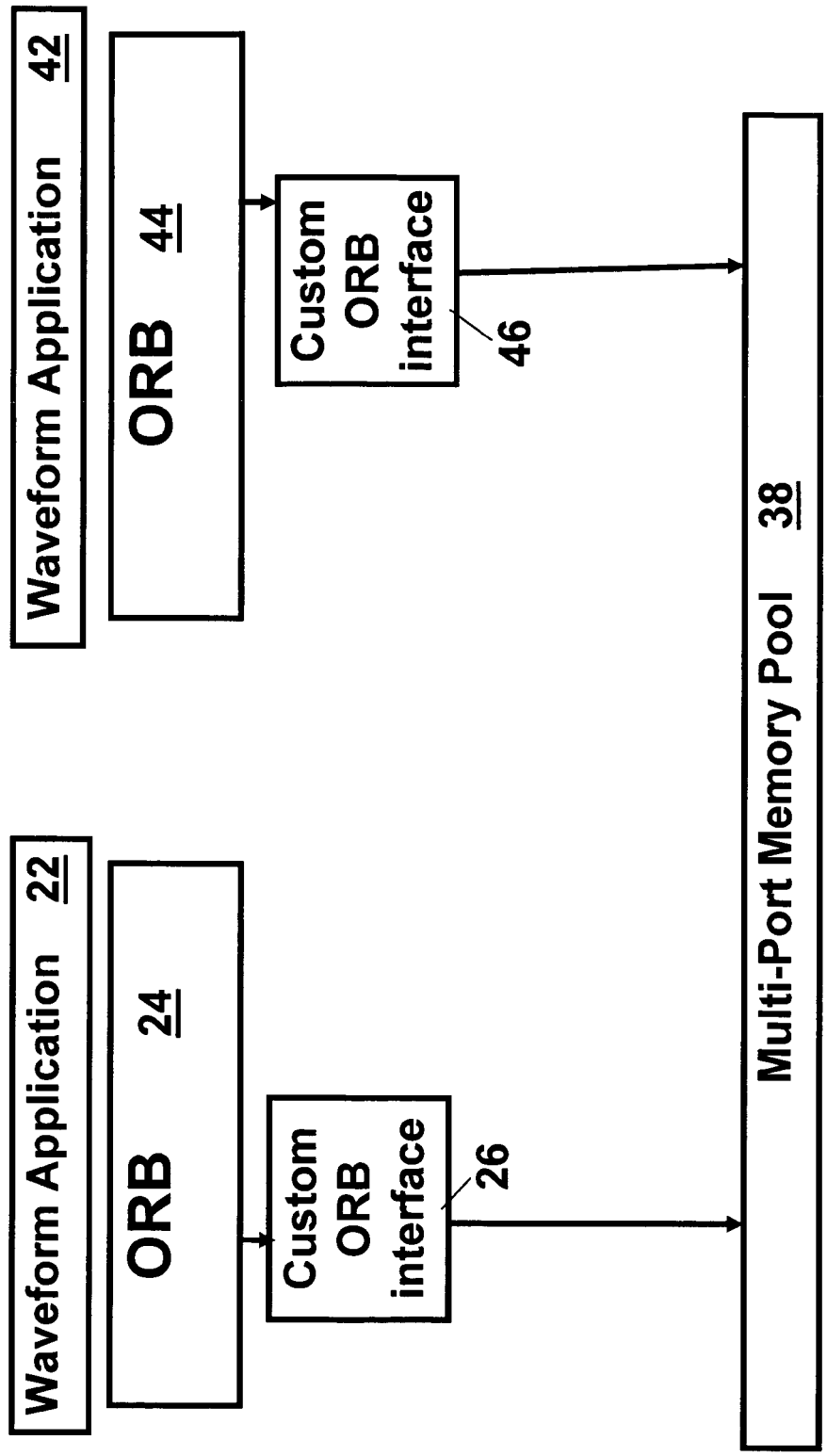
FIG. 3 is a functional view of an architecture for power restricted applications included in the communication apparatus of FIG. 1 in accordance with an exemplary embodiment.

FIG. 3 illustrates a functional view of an architecture for power restricted applications included in the communication apparatus 10 of FIG. 1. A waveform application 22 communicates with a waveform application 42 using a variety of functions. Additional fewer, or different functions may be performed in the communication process, depending on the particular embodiment.

The waveform application 22 uses an Object Request Broker (ORB) 24 to marshal data for communication to the waveform application 42. Similarly, waveform application 42 uses an ORB 44 to marshal data for communication to the waveform application 22.

According to an exemplary embodiment, in contrast to the conventional communication examples described with reference to FIG. 2, which have extensive delays in transporting data, custom ORB interfaces 26 and 46 can directly transport data into the process space of another process. The custom ORB interfaces 26 and 46 communicate via a multi-port memory pool 38. The memory pool 38 has the ability to appear in each process space and thus can be used to pass data directly and without transport overhead such as is incurred using TCP/IP.

Conventional systems have tried to achieve such efficiency and performance in several ways. The proprietary connections interfaces 30 and 50 (FIG. 1) are examples of an operating system (OS) communicating via a unique, non-portable operating system interface. The proprietary connections interfaces 30 and 50 cannot communicate with the operating system of another vendor. Such a restriction is unsuitable for JTRS requirements. The UDP/TCP interfaces 28 and 48 is another attempt for industry to communicate from one process space to another via operating system transfers. It, however, incurs very large overhead for simple transfers because it traverses the protocol stack and even supplies guaranteed return receipts for each transaction (TCP). While TCP may be reasonable when communicating New York to Paris, it is an absurd overhead to carry when one application is communicating to another application on the same processor or to the processor soldered on the same circuit card. The Ethernets 34 and 54 illustrate the most common form of the conventional art, that of communicating between different applications via Ethernet which is even more inefficient because it layers Ethernet protocol on top of TCP/IP.

Figure 4:
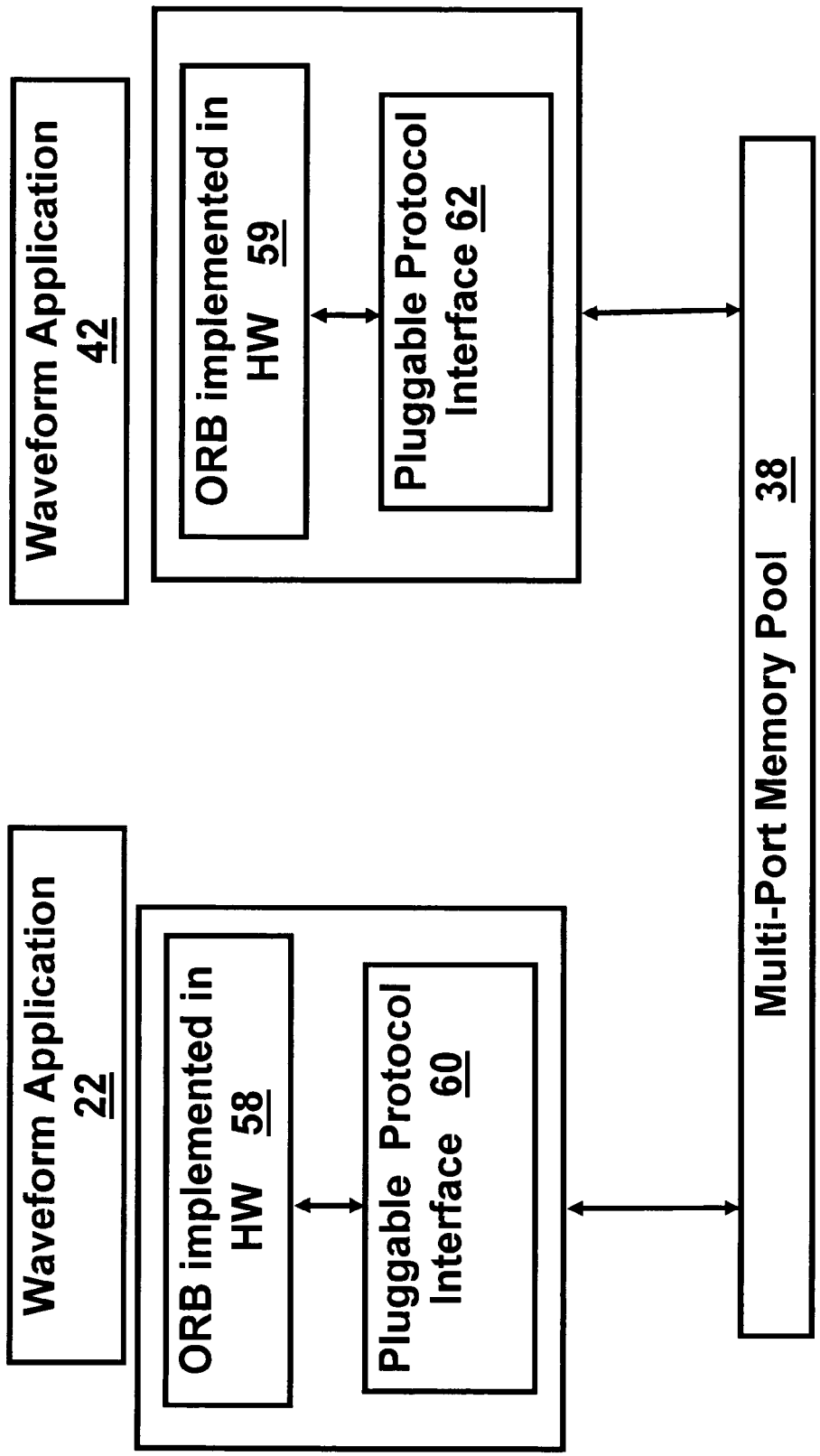
FIG. 4 is an implementation view of an architecture for power restricted applications included in the communication apparatus of FIG. 1 in accordance with an exemplary embodiment.

FIG. 4 illustrates an implementation view of an architecture for power restricted applications included in the communication apparatus 10 of FIG. 1. In FIG. 3, the power wasting middleware has been reduced to hardware and the functions that the operating system (OS) supplied which caused such delays (and demanded increased throughput) have been replaced by enabling the waveform application 22 to communicate directly with the waveform application 40 using ORBs 58 and 59 implemented in hardware and pluggable protocol interfaces 60 and 62. The pluggable protocol interfaces 60 and 62 provide a standardized interface as defined by the OMG (Object Management Group, an international standards making consortium).

The middleware and operating system functionality that is inefficient for software to implement is carried out in hardware. Alternatively, microprocessors are used that talk CORBA marshaled data natively. As such, the processor is relieved from executing a software application to arrange its bits in the right order. Because the ORB is intimately connected with the OS and the way the OS communicates into another "process space," just implementing the ORB in hardware is not sufficient because in many applications it is the slowness of the OS implementing the protocol stack that requires the excessive throughput. Thus, not all the OS or ORB is implemented in hardware, but rather that the portions that are impacting performance are implemented in hardware. For example, the OS protocol stack can be implemented in hardware. The OS protocol stack is portable and a standard way of interfacing. Data marshaling functions and logic and data functions that consume excessive processor throughput can also be implemented in hardware.

It is understood that although the detailed drawings and specific examples describe exemplary embodiments of a joint tactical radio system (JTRS) software computer architecture (SCA) co-processor, they are for purposes of illustration only. The exemplary embodiments are not limited to the precise details and descriptions described herein. For example, although particular devices and structures are described, other devices and structures could be utilized according to the principles of the present invention. Various modifications may be made and the details disclosed without departing from the spirit of the invention as defined in the following claims.

What is claimed is:

1. A system for a joint tactical radio system (JTRS) compliant device for providing communication at low power requirements, the system comprising:
    an object request broker that marshals data from a waveform application, wherein at least a portion of the object request broker is implemented in hardware rather than software;
    a pluggable protocol interface that communicates the marshaled data from the object request broker, wherein at least a portion of the pluggable protocol interface is implemented in hardware; and
    a memory pool that communicates data from the pluggable protocol interface directly and without transport overhead;
    wherein the portion of the pluggable protocol interface and the portion of the object request broker implemented in hardware comprise logic and data formatting functions of the object request broker that are determined to consume excessive processor throughput for a specific software application and an interface to the memory pool, wherein the logic and data formatting functions are implemented as a programmable application specific integrated circuit, wherein the pluggable protocol interface utilizes an operating system protocol stack, wherein the operating system protocol stack is implemented in hardware.

2. The system of claim 1, wherein the JTRS compliant device is in an unmanned craft.

3. The system of claim 1, wherein the JTRS compliant device is a battery powered radio.

4. The system of claim 1, wherein the pluggable protocol interface is entirely implemented in hardware.

5. The system of claim 1, wherein the object request broker is entirely implemented in hardware.

6. The system of claim 5, wherein no middleware is used.

7. The system of claim 1, wherein the JTRS compliant device is in an unmanned ground sensor.

8. The system of claim 1, wherein the JTRS compliant device is in a missile.

* * * * *